F. SAJTAR.
ANIMAL CATCHER.
APPLICATION FILED JUNE 14, 1921.
1,426,220.
Patented Aug. 15, 1922.
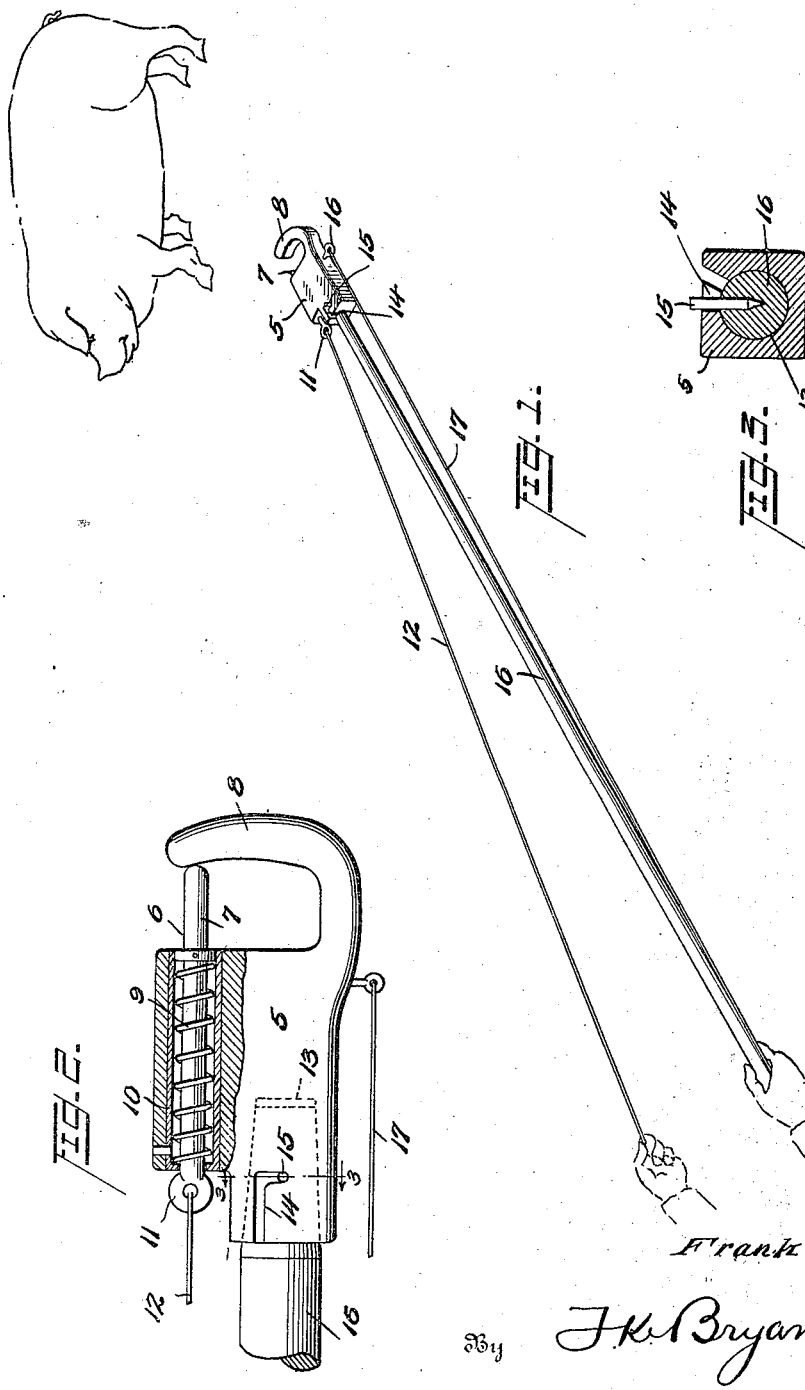

UNITED STATES PATENT OFFICE.

FRANK SAJTAR, OF POLAR, WISCONSIN.

ANIMAL CATCHER.

1,426,220.    Specification of Letters Patent.    Patented Aug. 15, 1922.

Application filed June 14, 1921. Serial No. 477,459.

*To all whom it may concern:*

Be it known that I, FRANK SAJTAR, a citizen of the United States of America, residing at Polar, in the county of Langlade and State of Wisconsin, have invented certain new and useful Improvements in Animal Catchers, of which the following is a specification.

This invention relates to certain new and useful improvements in animal catchers and has more particular reference to an improved means for catching and leading hogs.

The object of the invention is to provide a device of the above kind which may be easily manipulated by unskilled persons for effectively catching animals and wherein the structure is extremely simple and durable.

A further object is to generally simplify and improve hog catching devices.

With the above general objects in view and others that will appear as the nature of the invention is better understood, the same consists in the novel form, combination and arrangement of parts hereinafter more fully described and shown in the accompanying drawings, in which like reference characters indicate corresponding parts throughout the several views.

In the drawings,

Figure 1 is a perspective view of a hog catching device constructed in accordance with the present invention shown employed by a person in the act of catching a hog with the latch released, Figure 2 is an enlarged fragmentary view of the hook end portion of the device partly in side elevation and partly in section, and Figure 3 is a transverse sectional view taken upon line 3—3 of Figure 2.

Referring in detail to the views, the invention embodies a form or snap hook 5 with a side or lateral entrance opening 6 normally closed by a spring projected latch 7 which has its forward end normally engaging the adjacent end portion of the hook member 8 and closing the entrance opening 6 through the action of a spring 9, the latch 7 being slidably mounted in a lateral tubular guide 10 in which the spring 9 is also encased. The rear end of the latch 7 is provided with an eye 11 to which a suitable operating member 12 is attached, and this operating member is preferably of a flexible nature such as a cord of sufficient length to extend some distance from the snap hook 5 and by means of which the latch may be retracted for permitting the entrance of the animal's leg whereupon release of the latch will insure retention of the leg of the animal by said hook.

The body of the snap hook is provided with a socket 13, one wall of which is provided with a bayonet slot 14 and one end of a comparatively long handle 16 is adapted for snug reception within said socket 13 and has a laterally projecting prodding pin 15 for engagement in the slot 14 so as to detachably retain the handle in said socket. It is apparent that by slight rotation of the handle and an outward pull upon the same relative to the snap hook, said handle may be detached from the latter and a reverse of this operation will effect quick attachment of the handle to the snap hook. Also, as the handle 16 is of comparatively rigid material such as wood, the device may be readily directed into engagement with the animal's leg. An eye screw 16' or the like is attached to one side of the snap hook and a flexible member such as a cord 17 is attached to this eye, the cord 17 being substantially the same length as the handle 16 and the cord 12. Upon detachment of the handle 16 after the snap hook has been engaged with the animal's limb, said handle may be employed with the pin 15 used as a prod for inducing the animal to move to the required place at which time such animal will be led by means of the cord 17.

In the operation, the cord 17 and the handle 16 are held in one hand while the cord 12 is pulled with the other hand for retracting the catch 7 as shown clearly in Figure 1. Upon engaging the animal's leg behind the hook member 8, the cord 12 will be released and the latch 7 will be automatically forced forwardly by the spring 9 to close the entrance opening 6 so as to retain the animal's leg in the snap hook. The handle 16 is then rotated and pulled outwardly from the socket 13 and the cord 17 is employed for leading the animal.

From the foregoing description, it is believed that the construction and operation of the present invention will be readily understood and appreciated by those skilled in the art. Minor changes may be made without departing from the invention as claimed.

What is claimed as new is:

An animal catching device embodying a snap hook having a side entrance opening and a spring projected longitudinally slidable latch normally closing said opening, a relatively long handle detachably secured to said snap hook, flexible means operable from a distant point for retracting said latch, and flexible means attached to the snap hook for leading the animal upon detachment of said handle, the means for detachably connecting the handle to the snap hook embodying a lateral prodding pin upon one end of the handle, and said snap hook being provided with a socket for reception of said one end of the handle with one wall of the same provided with a bayonet slot for reception of said pin.

In testimony whereof I affix my signature in presence of two witnesses.

FRANK SAJTAR.

Witnesses:
R. A. BLOEDORN,
JOHN BOWER.